United States Patent
Yoo et al.

(10) Patent No.: US 11,804,778 B2
(45) Date of Patent: Oct. 31, 2023

(54) DC-TO-DC CONVERTER AND INTEGRATED CIRCUIT INCLUDING THE SAME

(71) Applicant: Samsung Electronics Co., Ltd., Suwon-si (KR)

(72) Inventors: Sungmin Yoo, Seoul (KR); Taehwang Kong, Suwon-si (KR); Sangho Kim, Suwon-si (KR); Junhyeok Yang, Seoul (KR); Hyungmin Lee, Seoul (KR); Yunho Lee, Seoul (KR); Woojoong Jung, Seoul (KR)

(73) Assignees: Samsung Electronics Co., Ltd., Gyeonggi-do (KR); Korea University Research and Business Foundation, Seoul (KR)

( * ) Notice: Subject to any disclaimer, the term of this patent is extended or adjusted under 35 U.S.C. 154(b) by 164 days.

(21) Appl. No.: 17/389,806

(22) Filed: Jul. 30, 2021

(65) Prior Publication Data

US 2022/0131468 A1 Apr. 28, 2022

(30) Foreign Application Priority Data

Oct. 23, 2020 (KR) .......................... 10-2020-0138595

(51) Int. Cl.
*H02M 3/158* (2006.01)
*H02M 3/157* (2006.01)
*H02M 1/08* (2006.01)

(52) U.S. Cl.
CPC .......... *H02M 3/1588* (2013.01); *H02M 1/08* (2013.01); *H02M 3/157* (2013.01)

(58) Field of Classification Search
CPC .......................... H02M 3/1588; H02M 3/157
See application file for complete search history.

(56) References Cited

U.S. PATENT DOCUMENTS

| | | | |
|---|---|---|---|
| 6,577,110 B2 | 6/2003 | Van Auken | |
| 6,784,648 B2 | 8/2004 | Mitamura et al. | |
| 9,531,253 B2 | 12/2016 | Wahby et al. | |
| 9,768,686 B2 | 9/2017 | Malinin | |
| 10,044,267 B1* | 8/2018 | Childs | H02M 3/156 |
| 10,218,274 B1* | 2/2019 | Chan | H02M 1/14 |
| 10,381,927 B2 | 8/2019 | Childs | |

(Continued)

FOREIGN PATENT DOCUMENTS

| | | |
|---|---|---|
| JP | 5954256 B2 | 7/2016 |
| KR | 10-1199491 B1 | 11/2012 |
| KR | 10-1662262 B1 | 10/2016 |

*Primary Examiner* — Kyle J Moody
(74) *Attorney, Agent, or Firm* — Harness, Dickey & Pierce, P.L.C.

(57) ABSTRACT

A direct-current (DC)-DC converter includes a converting circuit including an inductor element. The converting circuit is configured to generate an output voltage from an input voltage based on a switching operation. An inductor current emulator is configured to adjust at least one parameter for changing a current peak value of the inductor element in response to a change in a level of the input voltage and is configured to generate an internal voltage based on the at least one parameter, which is adjusted. The inductor current emulator is configured to generate a control signal for controlling the switching operation such that current of the inductor element has a pattern corresponding to a pattern of the internal voltage.

20 Claims, 19 Drawing Sheets

(56) References Cited

U.S. PATENT DOCUMENTS

| | | |
|---|---|---|
| 10,581,325 B1 * | 3/2020 | Munroe .................. H02M 1/08 |
| 2005/0200342 A1 * | 9/2005 | Rudiak ............... H02M 3/1588 |
| | | 323/282 |
| 2017/0170729 A1 * | 6/2017 | Jung .................... H02M 3/158 |

* cited by examiner

US 11,804,778 B2

DC-TO-DC CONVERTER AND INTEGRATED CIRCUIT INCLUDING THE SAME

CROSS-REFERENCE TO RELATED APPLICATION

This application claims the benefit of Korean Patent Application No. 10-2020-0138595, filed on Oct. 23, 2020, in the Korean Intellectual Property Office, the disclosure of which is incorporated herein in its entirety by reference.

BACKGROUND

The inventive concepts relate to a direct-current (DC)-DC converter, and more particularly, to a DC-DC converter configured to convert a DC voltage having a first level into a DC voltage having a second level and an integrated circuit (IC) including the DC-DC converter.

The DC-DC converter may be a converter configured to convert the DC voltage having the first level into the DC voltage having the second level. The DC-DC converter may be used to supply power to an electronic device or supply charging power to a battery. Moreover, most mobile electronic devices (e.g., Internet of Things (IoT) devices, tablet personal computers (PCs), smartphones, wearable devices, and the like) may receive voltages (or power) from a battery and operate using a voltage converted by the DC-DC converter.

The DC-DC converter may be implemented as a buck converter, a boost converter, and/or a buck-boost converter. For example, the buck converter may perform a voltage conversion operation by fixing a peak value of current of an inductor element or fixing a length of a section for which an input voltage is provided to the inductor element. As a voltage of a battery, which is received by a buck converter of a mobile electronic device, drops, loss generated during an operation of the buck converter may increase. Accordingly, a ripple of an output voltage of the buck converter may become unstable. Thus, the efficiency of power supplied to the mobile electronic device may be lowered, and load in the mobile electronic device, which is sensitive to the ripple, may be affected.

SUMMARY

The inventive concepts provide a direct-current (DC)-DC converter configured to ensure a more efficient conversion operation and a stable ripple of output voltage even when a level of an input voltage is changed, and an integrated circuit (IC) including the DC-DC converter.

According to an aspect of the inventive concepts, there is provided a DC-DC converter including a converting circuit including an inductor element. The converting circuit is configured to generate an output voltage from an input voltage based on a switching operation. An inductor current emulator is configured to adjust at least one parameter for changing a current peak value of the inductor element in response to a change in a level of the input voltage and is configured to generate an internal voltage based on the at least one parameter, which is adjusted. The inductor current emulator is configured to generate a control signal for controlling the switching operation such that current of the inductor element has a pattern corresponding to a pattern of the internal voltage.

According to another aspect of the inventive concepts, there is provided an IC including a first input terminal configured to be connected to any one of a plurality of units. A first buck converter is connected to the first input terminal and is configured to receive a first input voltage and generate a first output voltage from the first input voltage. The first buck converter includes a first converting circuit including a first inductor element. The first converting circuit is configured to output the first output voltage from the first input voltage based on a first switching operation. A first inductor current emulator generates a first internal voltage using a first reference voltage, the first input voltage, and the first output voltage and is configured to generate a first control signal for controlling the first switching operation such that current of the first inductor element has a pattern corresponding to a pattern of the first internal voltage.

According to another aspect of the inventive concepts, there is provided a DC-DC converter includes a converting circuit including an inductor element. The converting circuit is configured to provide an input voltage to the inductor element in a first section and is configured to provide a ground voltage to the inductor element in a second section. An inductor current emulator is configured to generate an internal voltage using a reference voltage, the input voltage, and an output voltage and is configured to generate a control signal for controlling the first and second sections such that current of the inductor element has an inverted pattern of a pattern of the internal voltage.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EXAMPLE EMBODIMENTS

Hereinafter, example embodiments will be described in detail with reference to the accompanying drawings.

Figure 1A:
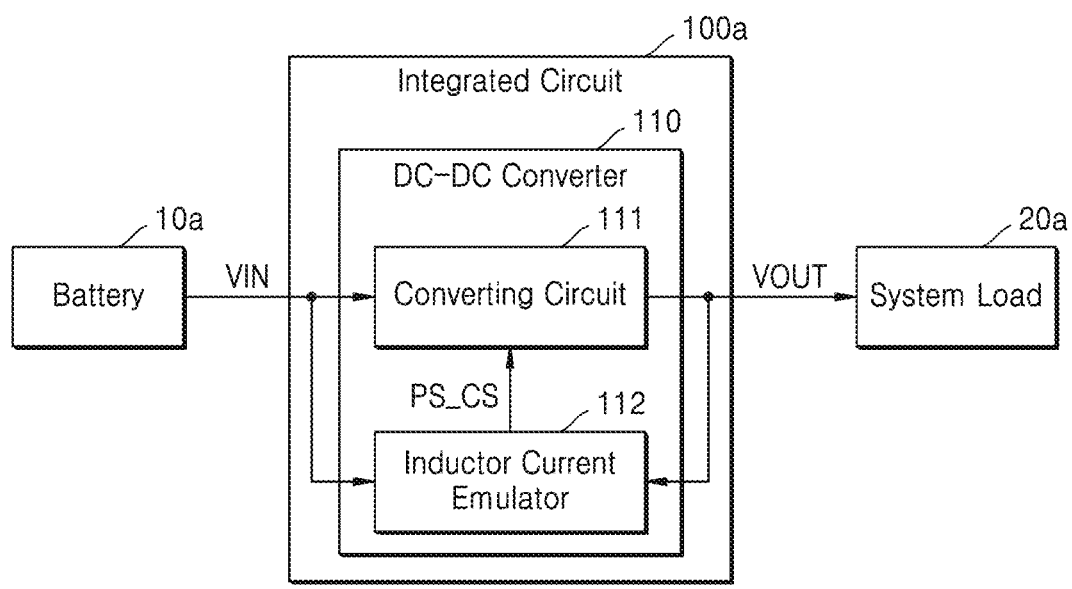
FIGS. 1A and 1B are schematic block diagrams of electronic devices according to example embodiments.
Figure 1B:
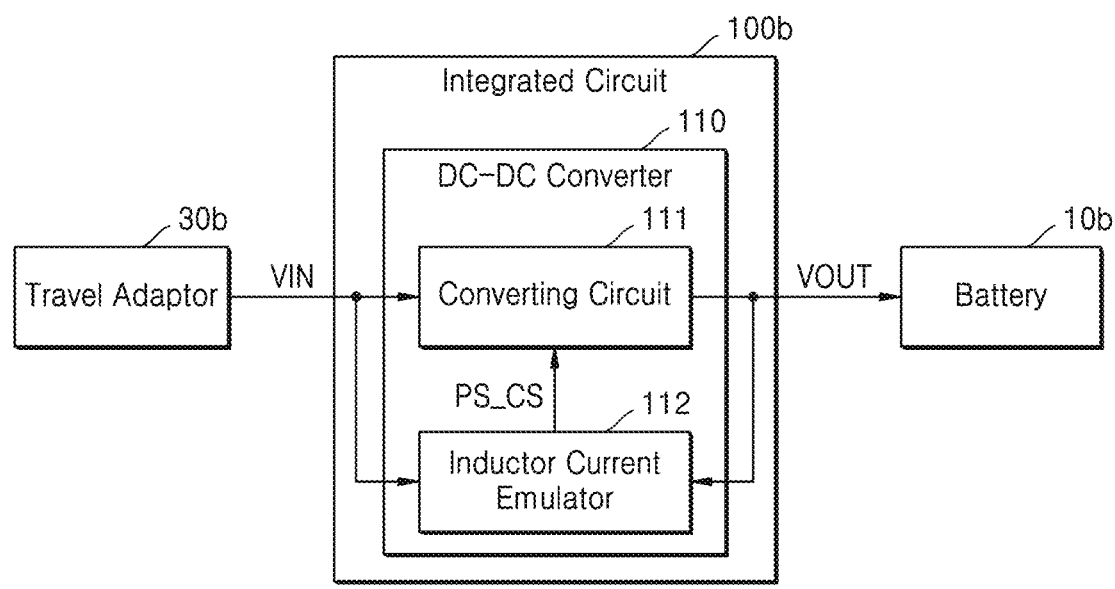

FIGS. 1A and 1B are schematic block diagrams of electronic devices 1a and 1b according to example embodiments.

Referring to FIG. 1A, the electronic device 1a may include a battery 10a, an integrated circuit (IC) 100a, and/or a system load 20a. For example, the IC 100a may be implemented as an IC chip and mounted on a printed circuit board (PCB). In addition, the electronic device 1a may include a mobile device, such as a smartphone, a tablet personal computer (PC), a mobile phone, a personal digital assistant (PDA), a laptop computer, a wearable device, a global positional system (GPS) device, an electronic book (e-book) terminal, a digital broadcasting terminal, an MPEG-1 audio layer 3 (MP3) player, and a digital camera. Furthermore, the electronic device 1a may include an Internet of Things (IoT) device or a device included in an electric vehicle. As an example, the battery 10a may be embedded in the electronic device 1a. As another example, the battery 10a may be detachably attached to the electronic device 1a. As an example, the system load 20a may include chips, modules, or a functional block included in the electronic device 1a. As a specific example, the system load 20a may include a modem, an application processor, a memory, a memory controller, a multimedia block, and/or a display.

In example embodiments, the IC 100a may include a DC-DC converter 110, and the DC-DC converter 110 may include a converting circuit 111 and/or an inductor current emulator 112. Referring to FIG. 1A, the DC-DC converter 110 may receive an input voltage VIN from the battery 10a, perform a DC-DC conversion operation, and provide an output voltage VOUT to the system load 20a. In some example embodiments, the IC 100a may be referred to as a supply IC or a power management IC (PMIC) configured to supply power to the system load 20a. Hereinafter, example embodiments in which a DC-DC converter is implemented as a buck converter will mainly be described. However, the inventive concepts are not limited thereto and may be applied to various DC-DC converters including a boost converter and a buck-boost converter. In some example embodiments, the IC 100a may be implemented as a module, chip, and/or package level.

In example embodiments, the converting circuit 111 may include an inductor element and generate the output voltage VOUT from the input voltage VIN based on a switching operation. The switching operation may include providing the input voltage VIN to the inductor element in a first section and providing a ground voltage to the inductor element in a second section that is subsequent to the first section. Thus, current of the inductor element may linearly increase in the first section and linearly decrease in the second section. The current of the inductor element may have a peak value at a time point of transition from the first section to the second section.

In example embodiments, the inductor current emulator 112 may adjust at least one parameter for changing a current peak value of the inductor element of the converting circuit 111 in response to a change in level of the input voltage VIN and generate an internal voltage based on the at least one parameter that is adjusted. The inductor current emulator 112 may generate a control signal PS_CS for controlling a switching operation of the converting circuit 111 such that the current of the inductor element of the converting circuit 111 has a pattern corresponding to a pattern of the internal voltage and provide the control signal PS_CS to the converting circuit 111.

In example embodiments, the at least one parameter may determine the pattern of the internal voltage of the inductor current emulator 112 and include a reference voltage and a capacitance, which are used to generate the internal voltage. In some example embodiments, the at least one parameter may vary according to a configuration of the inductor current emulator 112. A value, which is used to generate the internal voltage and easily changed in response to the change in the level of the input voltage VIN, may be set as a parameter. The inductor current emulator 112 may change the pattern of the internal voltage by adjusting the at least one parameter in response to the change in the level of the input voltage VIN, and generate the control signal PS_CS such that current of the inductor element of the converting circuit 111 has a pattern corresponding to the changed pattern of the internal voltage.

The DC-DC converter 110 according to example embodiments may not control a switching operation on the inductor element by sensing the current of the inductor element of the converting circuit 111, but may relatively easily control the pattern of the current of the inductor element by using the internal voltage generated by the inductor current emulator 112. Thus, even when the level of the input voltage VIN is changed, loss caused during a voltage conversion operation may be reduced or minimized, and a stable ripple of the output voltage VOUT may be ensured.

Referring further to FIG. 1B, the electronic device 1b may include a travel adaptor 30b, an IC 100b, and/or a battery 10b. The travel adaptor 30b may serve as a charger and convert AC power provided by a household power source or another power supply unit into DC power required to charge the battery 10b. The IC 100b may include a DC-DC converter 110. The DC-DC converter 110 may receive an input voltage VIN from the travel adaptor 30b, perform a DC-DC conversion operation, and provide an output voltage VOUT to the battery 10b. The battery 10b may be charged with the output voltage VOUT. The IC 100b may be referred to as a charging IC configured to charge the battery 10b.

A level of the input voltage VIN may be unintentionally changed according to the status (e.g., a power supply state from the power supply unit, a usage period, operating conditions, and the like) of the travel adaptor 30b and a type of the travel adaptor 30b. As described with reference to FIG. 1A, the DC-DC converter 110 may reduce or minimize loss in response to a change in the level of the input voltage VIN and perform a conversion operation for ensuring a stable ripple of the output voltage VOUT.

Figure 2:
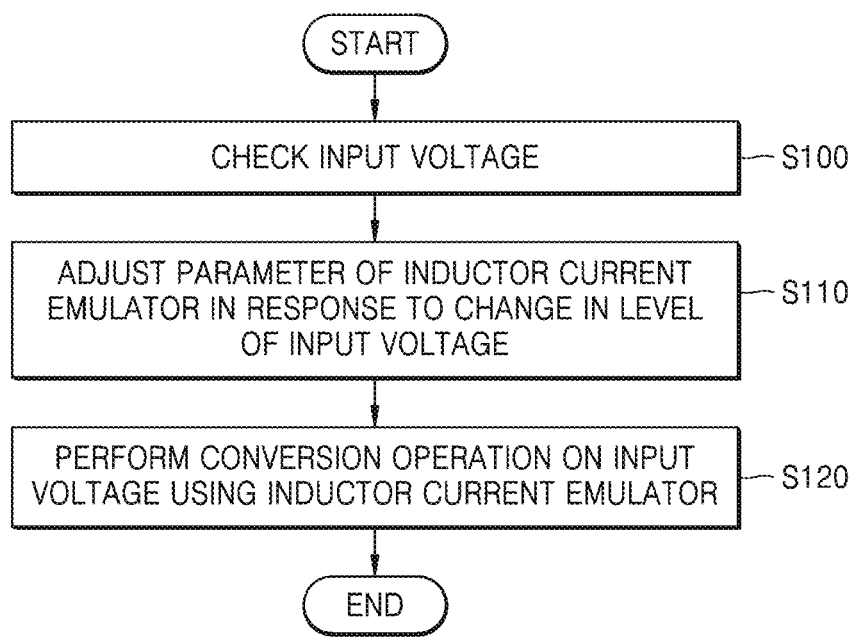
FIG. 2 is a flowchart of an operation of a direct-current (DC)-DC converter according to example embodiments.

FIG. 2 is a flowchart of an operation of a DC-DC converter according to example embodiments.

Referring to FIG. 2, in operation S100, the DC-DC converter may detect a received input voltage. That is, the DC-DC converter may continuously monitor the input voltage and detect a change in level of the input voltage. In operation S110, the DC-DC converter may adjust at least one parameter of an inductor current emulator included in the DC-DC converter based on the input voltage. The at least one parameter may determine a pattern of an internal voltage of the inductor current emulator and include a reference voltage and a capacitance of the inductor current emulator. For example, when the DC-DC converter detects the change in the level of the input voltage, the DC-DC converter may adjust a level of the reference voltage and generate the internal voltage using the adjusted reference voltage. In operation S120, the DC-DC converter may perform a conversion operation on the input voltage by using the inductor current emulator and generate an output voltage. For example, the inductor current emulator may generate a control signal and provide the control signal to the converting circuit such that current of an inductor element of a converting circuit included in the DC-DC converter has a pattern corresponding to the pattern of the internal voltage. As an example, the pattern of the current of the inductor element may have a mutual inversion relationship with the pattern of the internal voltage. The inversion relationship according to some example embodiments will be described below with reference to FIG. 6.

Figure 3:
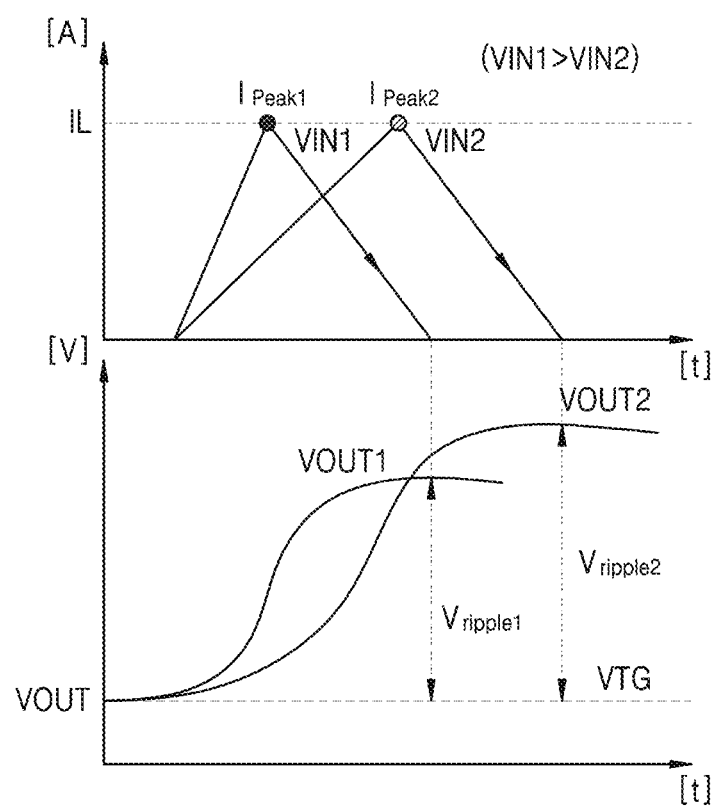
FIG. 3 is a diagram for explaining a comparative example of an operation of a DC-DC converter according to example embodiments.

FIG. 3 is a diagram for explaining a comparative example of an operation of a DC-DC converter according to example embodiments.

Referring to FIG. 3, the DC-DC converter may fix first and second peak values $I_{Peak1}$ and $I_{Peak2}$ of current IL of an inductor element and perform a switching operation based on the first and second peak values that are fixed. When the DC-DC converter receives a first input voltage VIN1 having a first level, the DC-DC converter may provide the first input voltage VIN1 to the inductor element in a first section, and the current IL of the inductor element may rise to the peak value $I_{Peak1}$. Subsequently, in a second section, the DC-DC converter may provide a ground voltage to the inductor element, and the current IL of the inductor element may be reduced to zero current. In some example embodiments, the DC-DC converter may output a first output voltage VOUT1 having a first ripple $V_{ripple1}$ from a target voltage VTG. A section including the first section and the second section may be defined as a switching section.

When the DC-DC converter receives a second input voltage VIN2 having a second level lower than the first level, the DC-DC converter may provide the second input voltage VIN2 to the inductor element in the first section, and the current IL of the inductor element may rise to the peak value $I_{Peak2}$. Subsequently, in the second section, the DC-DC converter may provide the ground voltage to the inductor element, and the current IL of the inductor element may be reduced to zero current. In some example embodiments, the DC-DC converter may output a second output voltage VOUT2 having a second ripple $V_{ripple2}$ from the target voltage VTG. Here, the second ripple $V_{ripple2}$ may be greater than the first ripple $V_{ripple1}$.

The DC-DC converter may be designed to reduce or minimize the sum of conduction loss and switching loss during a switching operation at a specific input voltage. Thus, the DC-DC converter may have optimum efficiency at the specific input voltage and show a drop in efficiency at another input voltage. For example, conduction loss caused during a switching operation of the DC-DC converter may be proportional to an amount of energy transmitted as an output signal through the inductor element in one switching section, and switching loss may be inversely proportional to the amount of energy. Thus, when an input voltage of the DC-DC converter is changed, the amount of energy transmitted as the output signal through the inductor element in the one switching section may be changed. In this process, conduction loss or switching loss caused during the switching operation of the DC-DC converter may be (for example, greatly) increased. As a result, the sum of conduction loss and switching loss may be (for example, greatly) increased. Accordingly, the energy efficiency of the DC-DC converter may be lowered. Furthermore, when a level of the input voltage of the DC-DC converter is changed, a ripple of an output voltage may also be changed, thus affecting a load or an element in the DC-DC converter that is sensitive to the ripple.

In the DC-DC converter according to example embodiments, even when the level of the input voltage is changed, improved or optimum energy efficiency may be maintained, and an output voltage having a more stable ripple may be ensured. Hereinafter, DC-DC converters according to example embodiments will be described.

Figure 4:
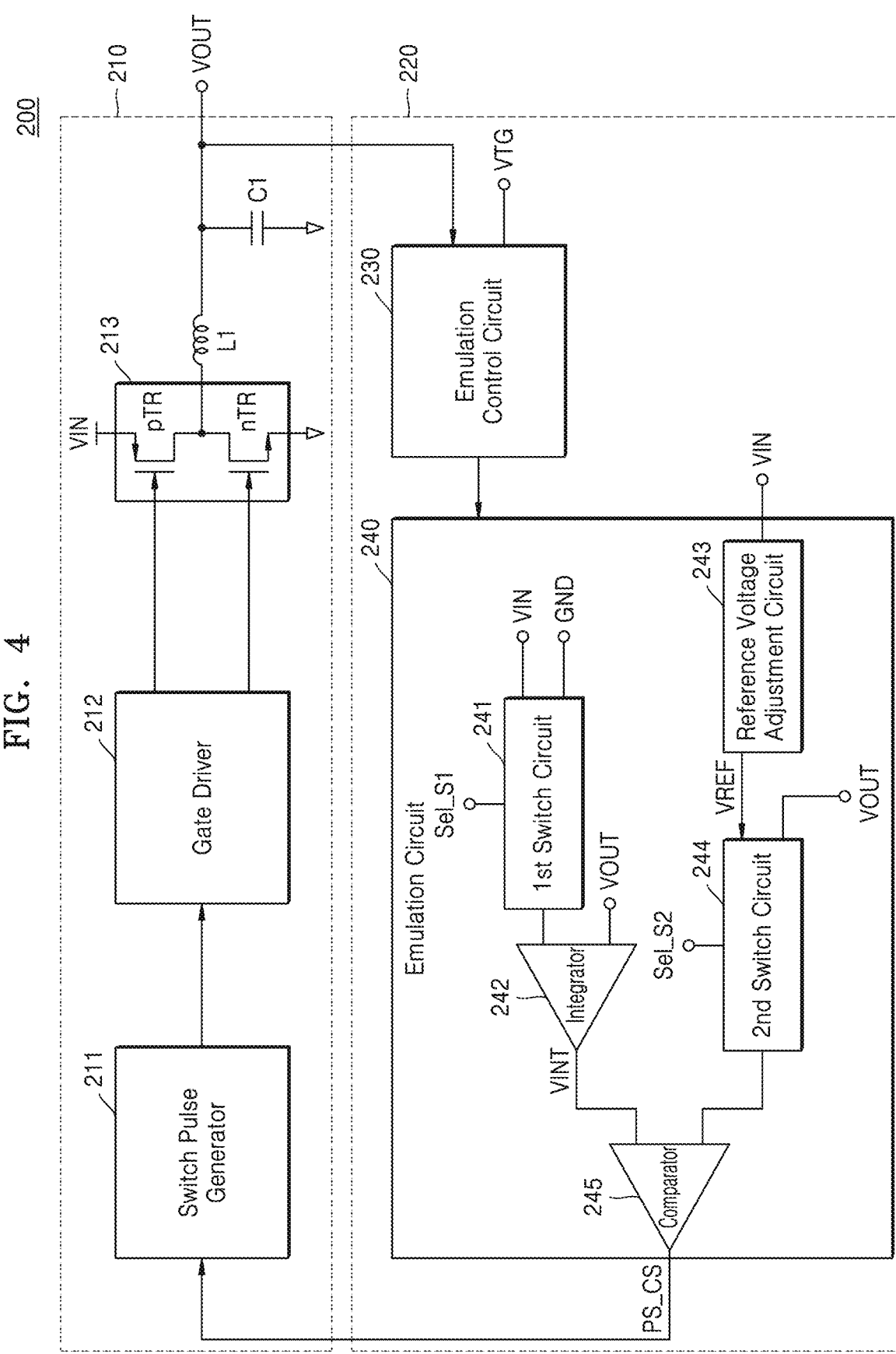
FIG. 4 is a diagram of a DC-DC converter according to example embodiments.

FIG. 4 is a diagram of a DC-DC converter 200 according to example embodiments. In the following descriptions, the DC-DC converter 200 may be assumed to be implemented as a buck converter.

Referring to FIG. 4, the buck converter 200 may include a converting circuit 210 and/or an inductor current emulator 220. The converting circuit 210 may include a switch pulse generator 211, a gate driver 212, a switch circuit 213, an inductor element L1, and/or a capacitor element C1. Because the converting circuit 210 of FIG. 4 may correspond to an embodied example including a minimum number of components for brevity, a DC-DC converter according to example embodiments is not limited thereto and may further include components required for a buck converting operation, or some components shown in FIG. 4 may be omitted. As an example, the converting circuit 210 may further include a diode (not shown) configured to control the flow of current. The switch pulse generator 211 may generate a pulse signal for controlling on/off operations of first and second transistors pTR and nTR included in the switch circuit 213. The gate driver 212 may receive the pulse signal and provide the pulse signal to each of the first and second transistors pTR and nTR. The switch circuit 213 may provide an input voltage VIN to the inductor element L1 in response to the pulse signal or provide a ground voltage. As an example, the first transistor pTR may be implemented as a pMOS transistor, and the second transistor nTR may be implemented as an nMOS transistor. For example, when the first transistor pTR is turned on and the second transistor nTR is turned off, the capacitor element C1 may be charged and current of the inductor element L1 may rise in a first section for which the input voltage VIN is provided to the inductor element L1. When the first transistor pTR is turned off and the second transistor nTR is turned on, the capacitor element C1 may be discharged, and the current of the inductor element L1 may be reduced in a second section for which a ground voltage is provided to the inductor element L1. The converting circuit 210 may repeat a switching section including the first and second sections and generate and output an output voltage VOUT from the input voltage VIN.

In example embodiments, the inductor element emulator 220 may generate a control signal PS_CS for controlling a current pattern of the inductor element L1 in the switching section and provide the control signal PS_CS to the switch pulse generator 211. The switch pulse generator 211 may generate a pulse signal based on the control signal PS_CS.

In example embodiments, the inductor element emulator 220 may include an emulation control circuit 230 and/or an emulation circuit 240. The emulation control circuit 230 may compare the output voltage VOUT with a target voltage VTG and activate or deactivate the emulation circuit 240 based on the comparison result. As an example, the emulation control circuit 230 may activate the emulation circuit 240 when the output voltage VOUT is dropped to the target voltage VTG.

In example embodiments, the emulation circuit 240 may include a first switch circuit 241, an integrator 242, a reference voltage adjustment circuit 243, a second switch circuit 244, and/or a first comparator 245. The first switch circuit 241 may provide any one of the input voltage VIN and a ground voltage GND to the integrator 242 in response to a first selection signal Sel_S1. The first selection signal Sel_S1 may be a signal for distinguishing an initial section and the first section from the second section. For example, the first selection signal Sel_S1 may have a value for allowing the first switch circuit 241 to select the input voltage VIN and provide the input voltage VIN to the integrator 242 in the initial section and the first section and may have a value for allowing the first switch circuit 241 to select the ground voltage GND and provide the ground voltage GND to the integrator 242 in the second section. Moreover, the initial section may be a section for initializing the integrator 242 configured to generate an internal voltage VINT, and the first and second sections may be included in the switching section. In example embodiments, the first selection signal Sel_S1 may be the same as the control signal PS_CS or generated from the control signal PS_CS.

The integrator 242 may receive the input voltage VIN or the ground voltage GND from the first switch circuit 241 and receive the output voltage VOUT. As an example, in the initial section, the integrator 242 may receive the input voltage VIN and the output voltage VOUT and generate an internal voltage VINT having the same level as the output voltage VOUT. In the first section, the integrator 242 may receive the input voltage VIN and the output voltage VOUT and generate an internal voltage VINT of which a level is dropped. In the second section, the integrator 242 may receive the ground voltage GND and the output voltage VOUT and generate an internal voltage VINT of which a level is elevated. Based on a drop or rise in the internal voltage VINT of the integrator 242, the first section may be referred to as a discharging section of the integrator 242, and the second section may be referred to as a charging section of the integrator 242.

The reference voltage adjustment circuit 243 may receive an input voltage VIN, detect a change in level of the input voltage VIN, and adjust a level of a reference voltage VREF. The reference voltage adjustment circuit 243 may change a pattern of the internal voltage VINT by adjusting the level of the reference voltage VREF, and change a pattern of current of the inductor element L1 in response to the change in the level of the input voltage VIN. For example, the pattern of the current of the inductor element L1 may include at least one of a peak value of current, time lengths of the first and second sections, and a ratio between the first and second sections.

The second switch circuit 244 may provide any one of the reference voltage VREF and the output voltage VOUT to the first comparator 245 in response to a second selection signal Sel_S2. The second selection signal Sel_S2 may be a signal for distinguishing the initial section and the first section from the second section. For example, the second selection signal Sel_S2 may have a value for allowing the second switch circuit 244 to select the reference voltage VREF and provide the reference voltage VREF to the first comparator 245 in the initial section and the first section, and may have a value for allowing the second switch circuit 244 to select the output voltage VOUT and provide the output voltage VOUT to the first comparator 245 in the second section. In example embodiments, the second selection signal Sel_S2 may be the same as the control signal PS_CS or generated from the control signal PS_CS.

The first comparator 245 may compare the reference voltage VREF or the output voltage VOUT with the internal voltage VINT, generate the control signal PS_CS based on a comparison result, and provide the control signal PS_CS to the converting circuit 210. Due to the operation of the first comparator 245, the internal voltage INT may be dropped from the output voltage VOUT to the reference voltage VREF in the first section, and be boosted from the reference voltage VREF to a predetermined or alternatively, desired voltage level in the second section.

A specific pattern of the internal voltage VINT and a specific pattern of the current of the inductor element L1 due to operations of the buck converter 200 will be described below with reference to FIG. 6.

The inductor current emulator 220 shown in FIG. 4 is only an example embodiment, and the inventive concepts are not limited thereto and may be applied to various embodied examples of generating a predetermined or alternatively, desired voltage or current, which mimics current of the inductor element L1, and generating the control signal PS_CS for forming a pattern of the current of the inductor element L1 based on the generated voltage or current.

Figure 5A:
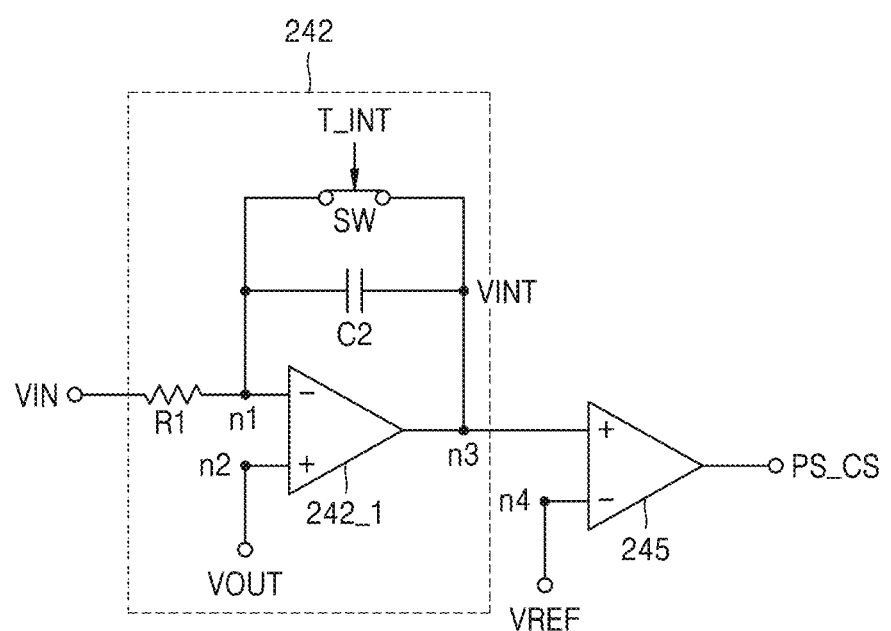
FIGS. 5A to 5C are diagrams for explaining embodied examples and operations of an integrator of FIG. 4.
Figure 5B:
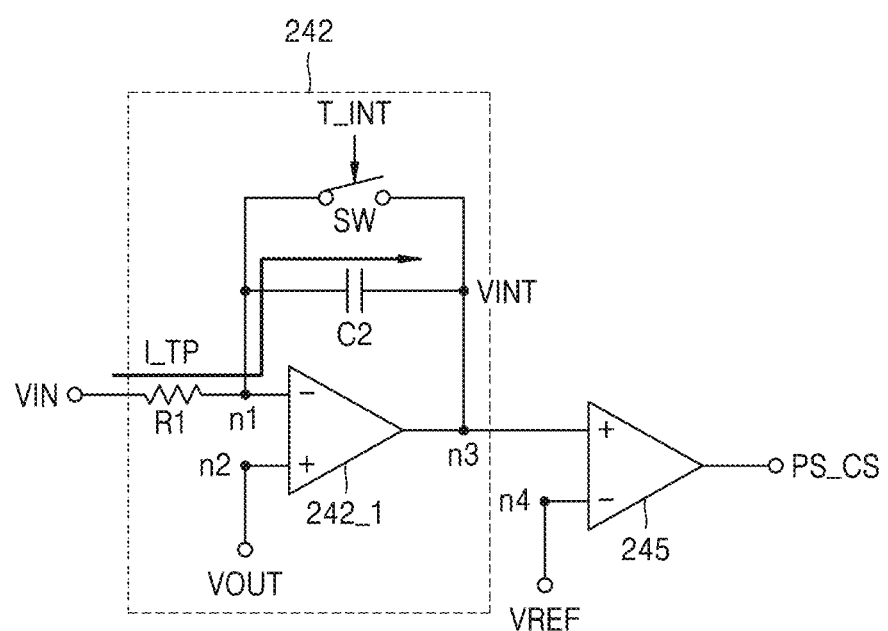
Figure 5C:
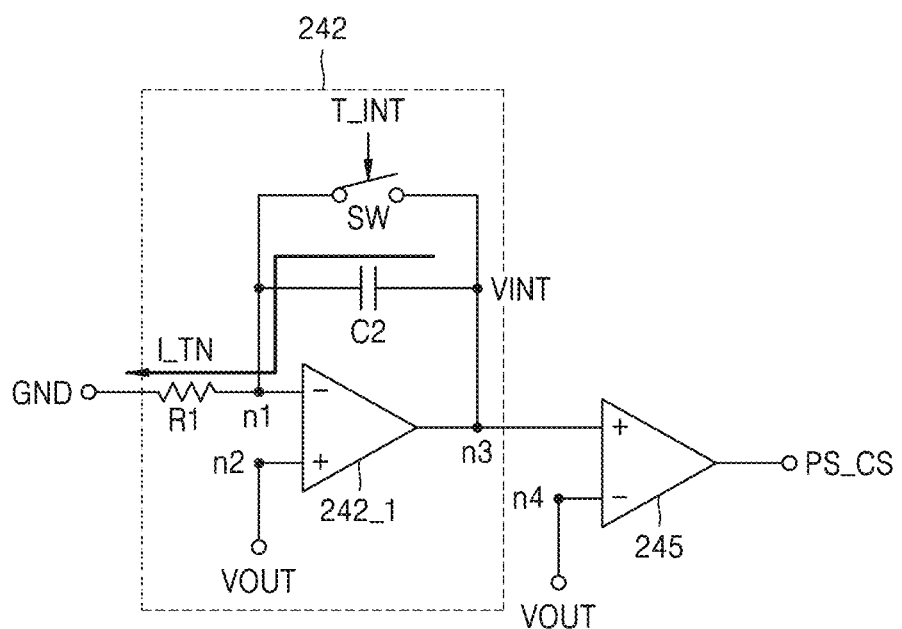

FIGS. 5A to 5C are diagrams for explaining embodied examples and operations of the integrator 242 of FIG. 4. Hereinafter, FIGS. 5A to 5C will be described with further reference to FIG. 4 for brevity. It is assumed that FIG. 5A shows an initial section of the integrator 242, FIG. 5B shows a discharging section of the integrator 242, and FIG. 5C shows a charging section of the integrator 242.

Referring to FIG. 5A, the integrator 242 may include a second comparator 242_1, a capacitor element C2, a switch element SW, and/or a resistor element R1. The second comparator 242_1 may be connected to a first input node n1 connected to a first switch circuit (refer to 241 in FIG. 4) and a second input node n2 configured to receive an output voltage VOUT. The capacitor element C2 may be connected between the first input node n1 and an output node n3 of the second comparator 242_1 configured to output an internal voltage VINT. The switch element SW may be connected in parallel to the capacitor element C2 between the first input node n1 and the output node n3. The resistor element R1 may be connected between the first switch circuit 241 and the first input node n1. The first comparator 245 may be connected to the output node n3 of the second comparator 242_1 and a fourth input node n4 connected to a second switch circuit (refer to 244 in FIG. 4).

In the initial section, the switch element SW may be closed in response to an initial signal T_INT, and the second comparator 242_1 may receive an input voltage VIN and the output voltage VOUT and output the internal voltage VINT having the same level as the output voltage VOUT to the first comparator 245. The first comparator 245 may receive the internal voltage VINT and a reference voltage VREF and generate a control signal PS_CS based on the internal voltage VINT and the reference voltage VREF. As an example, the first comparator 245 may generate a control signal PS_CS for initializing the internal voltage VINT to the same level as the output voltage VOUT for a predetermined or alternatively, desired time period in the initial section. After the predetermined or alternatively, desired time period has elapsed, the first comparator 245 may generate a control signal PS_CS for starting the discharging section.

Referring further to FIG. 5B, in the discharging section, the switch element SW may be opened in response to the initial signal T_INT, and the second comparator 242_1 may receive the input voltage VIN and the output voltage VOUT. In some example embodiments, a discharging current I_TP for discharging the capacitor element C2 may be supplied to the integrator 242. The integrator 242 may output the internal voltage VINT of which a level is linearly dropped to the first comparator 245. The first comparator 245 may receive the internal voltage VINT and a reference voltage VREF and generate a control signal PS_CS based on the internal voltage VINT and the reference voltage VREF. As an example, the first comparator 245 may generate a control signal PS_CS for increasing current of an inductor element L1 in response to a drop of the internal voltage VINT to the reference voltage VREF. The first comparator 245 may generate a control signal PS_CS for starting the charging section when the internal voltage VINT reaches the reference voltage VREF after the discharging section ends.

Referring further to FIG. 5C, in the charging section, the switch element SW may be still opened in response to the initial signal T_INT, and the second comparator 242_1 may receive the ground voltage GND and the output voltage VOUT. In some example embodiments, a charging current I_TN for charging the capacitor element C2 may be supplied to the integrator 242. The integrator 242 may output an internal voltage VINT of which a level linearly rises to the first comparator 245. The first comparator 245 may receive the internal voltage VINT and the output voltage VOUT and generate a control signal PS_CS based on the internal voltage VINT and the output voltage VOUT. As an example, the first comparator 245 may generate a control signal PS_CS for reducing current of the inductor element L1 in response to a rise in the internal voltage VINT to a predetermined or alternatively, desired voltage level. The first comparator 245 may generate a control signal PS_CS for preparing for the next switching operation when the internal voltage VINT reaches the predetermined or alternatively, desired voltage level after the charging section ends. Moreover, in some example embodiments, the initial signal T_INT described above may be generated by the emulation control circuit 230 of FIG. 4.

Figure 6:
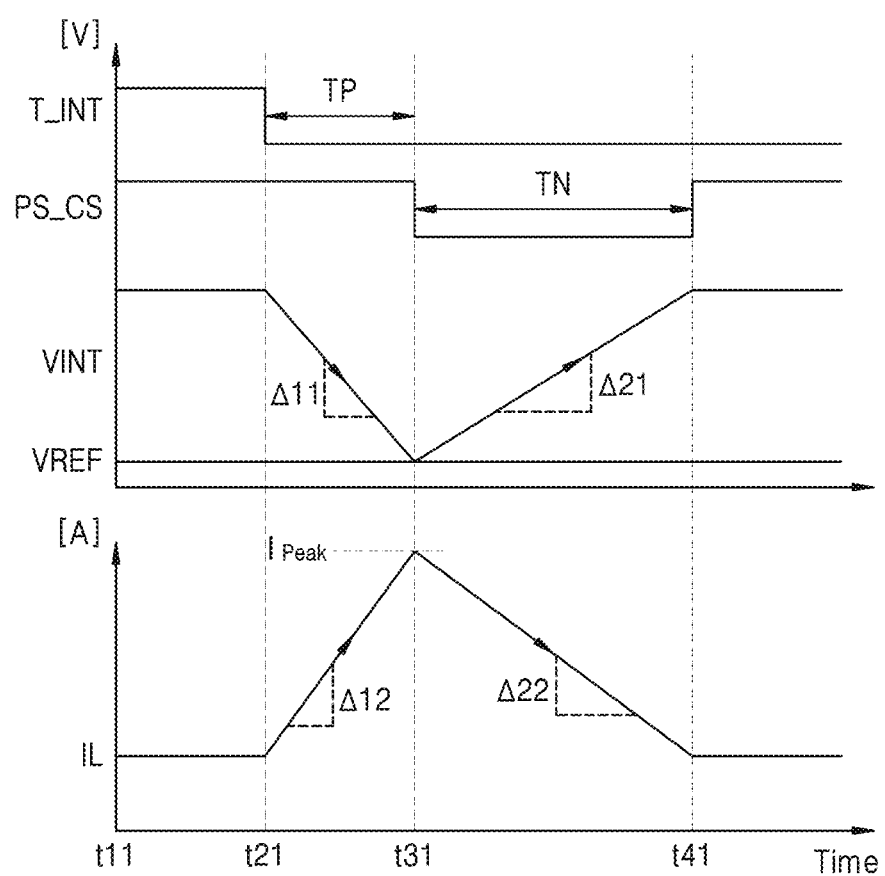
FIG. 6 is a graph for explaining a relationship between an internal voltage and current of an inductor element, according to example embodiments.

FIG. 6 is a graph for explaining a relationship between an internal voltage VINT and current IL of an inductor element L1, according to some example embodiments. Hereinafter, FIG. 6 will be described with further reference to FIGS. 4 and 5A to 5C for brevity.

Referring to FIG. 6, a time period between a first time point t11 and a second time point t21 may correspond to an initial section, an initial signal T_INT may have a high level, and an internal voltage VINT may have the same level as an output voltage VOUT. Also, the current IL of the inductor element L1 may have a constant level. A control signal PS_CS generated in the initial section may have a high level.

A time period between the second time point t21 and a third time point t31 may correspond to a discharging section of the capacitor element C2, the initial signal TINT may have a low level, and the internal voltage VINT may drop at a first slope Δ11. In the discharging section, the internal voltage VINT may drop and reach the reference voltage VREF. Moreover, the first slope Δ11 may be expressed as in Equation 1:

$$\Delta11 = \frac{VOUT - VREF}{TP} = \frac{VIN - VOUT}{R \cdot C} \quad \text{[Equation 1]}$$

wherein 'TP' denotes a time length of the discharging section, 'R' denotes a resistance of a resistor element R of the integrator 242, and 'C' denotes a capacitance of the capacitor element C2 of the integrator 242. Also, the current IL of the inductor element L1 may increase at a second slope Δ12 corresponding to the first slope Δ11 in a first section corresponding to the discharging section. In the first section, the current IL of the inductor element L1 may increase and reach a peak value $I_{Peak}$ corresponding to the reference voltage VREF.

A time period between the third time point t31 and a fourth time point t41 may correspond to a charging section of the capacitor element C2, the initial signal T_INT may still have a low level, and the internal voltage VINT may rise at a third slope Δ21. In the charging section, the internal voltage VINT may rise and reach a predetermined or alternatively, desired voltage level. Moreover, the third slope Δ21 may be expressed as in Equation 2:

$$\Delta21 = \left|\frac{VOUT - VREF}{TN}\right| = \frac{VOUT}{Re \cdot C} \quad \text{[Equation 2]}$$

wherein 'TN' denotes a time length of the charging section, 'Re' denotes the resistance of the resistor element R of the integrator 242, and 'C' denotes the capacitance of the capacitor element C2 of the integrator 242. Also, the current IL of the inductor element L1 may be reduced at a fourth slope Δ22 corresponding to the third slope Δ21 in a second section corresponding to the charging section. In the second section, the current IL of the inductor element L1 may be reduced and reach a predetermined or alternatively, desired level.

In example embodiments, a pattern of the internal voltage VINT may have a mutual inversion relationship with the current IL of the inductor element L1. For example, the first slope 411 may have a negative value, and the second slope Δ12 corresponding to the first slope Δ11 may have a positive value. Also, an absolute value of the second slope Δ12 may be proportional to an absolute value of the first slope Δ11. The third slope Δ21 may have a positive value, and the fourth slope Δ22 corresponding to the third slope Δ21 may have a negative value. In addition, an absolute value of the fourth slope Δ22 may be proportional to an absolute value of the third slope Δ2.

Moreover, the second and fourth slopes Δ12 and Δ22 may be respectively expressed as in Equations 3 and 4:

$$|\Delta21| = \frac{I_{Peak}}{TP} = \frac{VIN - VOUT}{L} \quad \text{[Equation 3]}$$

$$|\Delta21| = \frac{I_{Peak}}{TN} = \frac{VOUT}{L} \quad \text{[Equation 4]}$$

wherein 'TP' denotes the time length of the discharging section, 'TN' denotes the time length of the charging section, and 'L' denotes an inductance of the inductor element L1 of the converting circuit 210.

From Equations 1 and 2, a ratio between the first and third slopes Δ11 and Δ21 may be expressed as in Equation 5:

$$\left|\frac{VOUT - VREF}{TP}\right| : \left|\frac{VOUT - VREF}{TN}\right| = \frac{VIN - VOUT}{Re \cdot C} : \frac{VOUT}{Re \cdot C} \quad \text{[Equation 5]}$$

wherein 'TP' denotes the time length of the discharging section, 'TN' denotes the time length of the charging section, 'Re' denotes the resistance of the resistor element R of the integrator 242, and 'C' denotes the capacitance of the capacitor element C2 of the integrator 242. By rewriting Equation 5, a ratio between the time length TP of the discharging section and the time length TN of the charging section may be expressed as in Equation 6:

$$TP:TN = VOUT:VIN - VOUT \quad \text{[Equation 6]}$$

That is, the time length of the discharging section may be equal to a time length of the first section for which an input voltage VIN is provided to the inductor element L1, and the time length TN of the charging section may be equal to a time length of the second section for which a ground voltage is provided to the inductor element L1. In other words, the buck converter 200 according to example embodiments may not include an additional circuit configured to detect zero current of the inductor element L1 to end the second section, and a time point at which the second section ends may be determined based on the output voltage VOUT and the input voltage VIN by using the inductor current emulator 220. Accordingly, a circuit design of the buck converter 200 according to example embodiments may be simplified and/or miniaturized.

In addition, by rewriting Equation 1, the time length TP of the charging section may be expressed as in Equation 7:

$$TP = \frac{VOUT - VREF}{VIN - VOUT} \cdot (Re \cdot C) \quad \text{[Equation 7]}$$

From Equations 3 and 7, the peak value $I_{Peak}$ of the inductor current IL may be expressed as in Equation 8:

$$I_{Peak} = TP \cdot \frac{VIN - VOUT}{L} = \frac{VOUT - VREF}{L} \cdot (Re \cdot C) \quad \text{[Equation 8]}$$

As shown in Equation 8, the peak value $I_{Peak}$ of the inductor current IL may be independent of the input voltage VIN and dependent on the reference voltage VREF, the capacitance C, and the resistance R of the inductor current emulator 220. In example embodiments, the inductor current emulator 220 may adjust at least one of the reference voltage VREF, the capacitance C, and the resistance R to change the peak value $I_{Peak}$ of the inductor current IL as described in detail below with reference to FIGS. 7A and 7B.

Figure 7A:
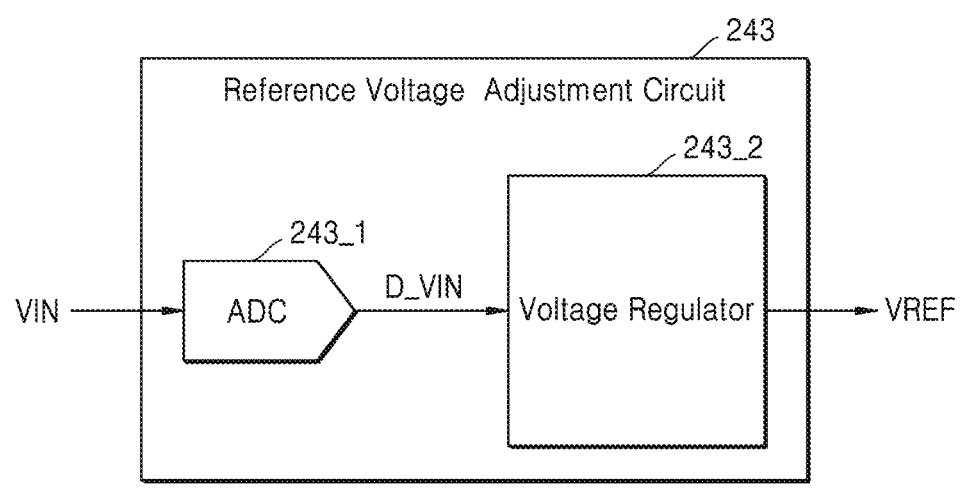
FIGS. 7A and 7B are diagrams for explaining embodied examples and operations of a reference voltage adjustment circuit of FIG. 4.
Figure 7B:
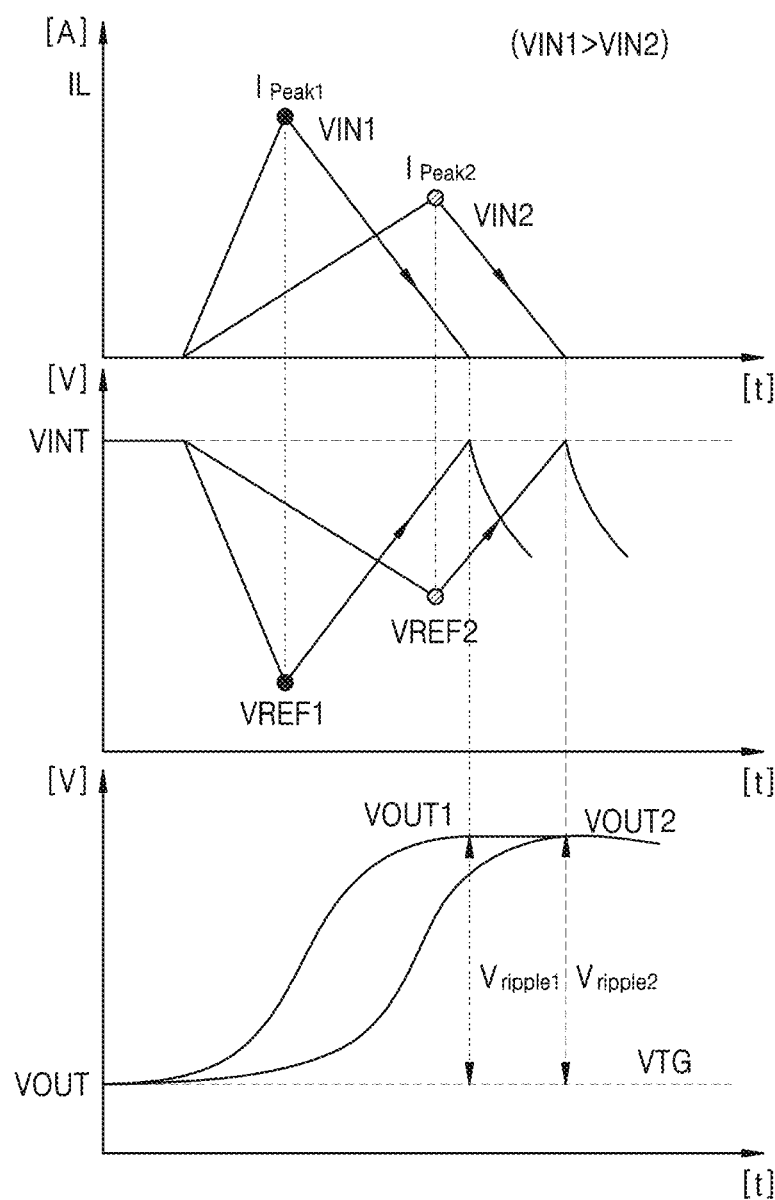

FIGS. 7A and 7B are diagrams for explaining embodied examples and operations of the reference voltage adjustment circuit 243 of FIG. 4. Hereinafter, FIGS. 7A and 7B will be described with further reference to FIG. 4 for brevity.

Referring to FIG. 7A, the reference voltage adjustment circuit 243 may include an analog-to-digital converter (ADC) circuit 243_1 and/or a voltage regulator 243_2. The ADC circuit 243_1 may receive an input voltage VIN and generate a digital signal D_VIN having a different value according to a level of the input voltage VIN. The voltage regulator 243_2 may output a reference voltage VREF of which a level is adjusted based on the digital signal D_VIN. However, because the reference voltage adjustment circuit 243 of FIG. 7A is only an embodied example, a reference voltage adjustment circuit according to example embodiments is not limited thereto and may adjust the level of the reference voltage VREF in response to a change in the level of the input voltage VIN. For example, the reference voltage adjustment circuit 243 may include a look-up table and be implemented to output the reference voltage VREF corresponding to the level of the input voltage VIN, which is received, by referring to the look-up table.

Referring further to FIG. 7B, when the buck converter 200 receives a first input voltage VIN1 having a first level, the reference voltage adjustment circuit 243 may output a first reference voltage VREF1. The internal voltage VINT may be dropped to the first reference voltage VREF1 in a discharging section. Current IL of the inductor element L1 may rise to a first peak value $I_{Peak1}$ in a first section corresponding to the discharging section. The first peak value $I_{Peak1}$ may be determined based on the first reference voltage VREF1 as in Equation 8 described above. The internal voltage VINT may be boosted from the first reference voltage VREF1 to a predetermined or alternatively, desired voltage level in a charging section. The current IL of the inductor element L1 may be dropped to the predetermined or alternatively, desired current level in a second section corresponding to the charging section. The converting circuit 210 may repeat a switching section including the first and second sections and output a first output voltage VOUT1 from the first input voltage VIN1.

When the buck converter 200 receives a second input voltage VOUT2 having a second level lower than the first level, the reference voltage adjustment circuit 243 may output a second reference voltage VREF2 having a higher level than the first reference voltage VREF1. The internal voltage VINT may be dropped to the second reference voltage VREF2 in the discharging section. The current IL of the inductor element L1 may rise to a second peak value $I_{Peak2}$, which is lower than the first peak value $I_{Peak1}$, in the first section corresponding to the discharging section. The second peak value $I_{Peak2}$ may be determined based on the second reference voltage VREF2 as shown in Equation 8 described above. The internal voltage VINT may be boosted from the second reference voltage VREF2 to the predetermined or alternatively, desired voltage level in the charging section. The current IL of the inductor element L1 may be dropped to the predetermined or alternatively, desired current level in the second section corresponding to the charging section. The converting circuit 210 may repeat the switching section including the first and second sections and output the second output voltage VOUT2 from the second input voltage VIN2. A second ripple $V_{ripple2}$ between the second output voltage VOUT2 and a target voltage VTG may be equal or similar to a first ripple $V_{ripple1}$ between the first output voltage VOUT1 and the target voltage VTG. Accordingly, a level difference between the first and second output voltages VOUT1 and VOUT2 may be maintained within a threshold range.

When the level of the input voltage VIN is changed, the buck converter 200 according to example embodiments may adjust a peak value $I_{Peak}$ of the current IL of the inductor element L1 by adjusting the reference voltage VREF. Accordingly, an amount of energy transmitted through the inductor element L1 in the switching section may be adjusted to reduce conduction loss or switching loss described above. Thus, the sum of conduction loss and switching loss may remain a reduced or minimum value, and an output voltage VOUT having a more stable ripple may be generated. As a result, even when the level of the input voltage VIN is changed, a drop in energy efficiency may be reduced or prevented during a conversion operation of the buck converter 200, and the buck converter 200 may more stably perform the conversion operation.

Figure 8A:
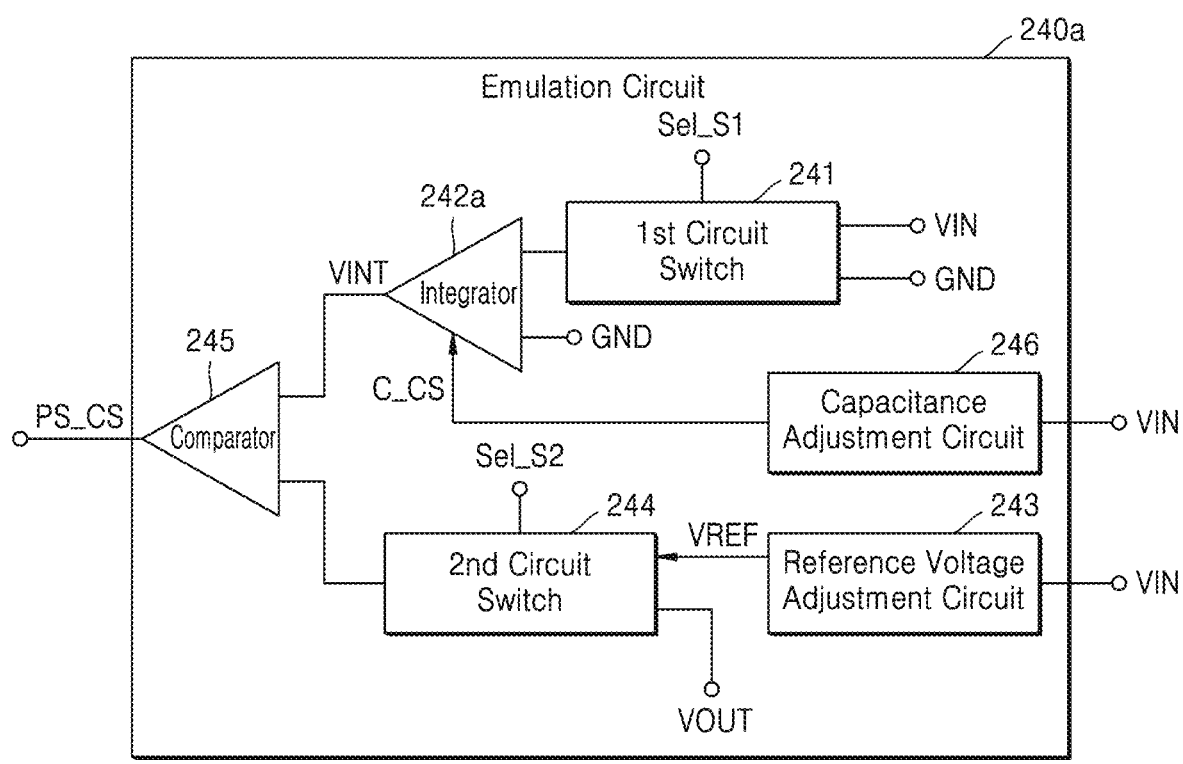
FIG. 8A is a block diagram of an emulation circuit according to example embodiments.
Figure 8B:
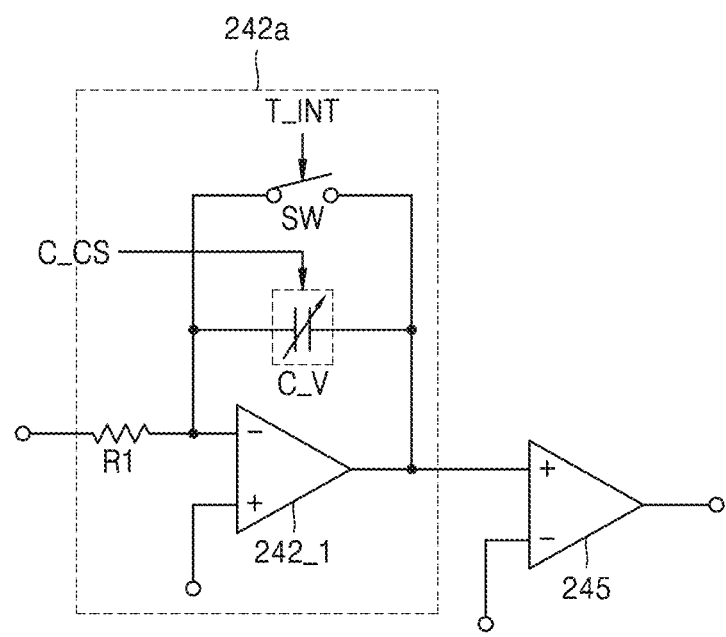
FIG. 8B is a detailed diagram of an integrator of FIG. 8A.

FIG. 8A is a block diagram of an emulation circuit 240a according to example embodiments, and FIG. 8B is a detailed diagram of an integrator 242a of FIG. 8A. Hereinafter, the descriptions of the emulation circuit 240a and the integrator 242a that are the same as those of the emulation circuit 240 and the integrator 242 of FIG. 4 will be omitted.

Referring to FIG. 8A, as compared with the emulation circuit 240 of FIG. 4, the emulation circuit 240a may further include a capacitance adjustment circuit 246. The capacitance adjustment circuit 246 may receive an input voltage VIN and generate a capacitance control signal C_CS for adjusting a capacitance of the integrator 242a based on the input voltage VIN. As described with reference to Equation 8 of FIG. 6, the capacitance adjustment circuit 246 may change the capacitance of the integrator 242a to change a peak value of an inductor current. As an example, when a level of the input voltage VIN is changed to be lower than before, the capacitance adjustment circuit 246 may generate a capacitance control signal C_CS for adjusting the capacitance of the integrator 242a to a lower value than before. The integrator 242a may adjust the capacitance based on the capacitance control signal C_CS.

Referring further to FIG. 8B, as compared with the integrator 242 of FIG. 4 the integrator 242a may include a variable capacitor element C_V. The variable capacitor element C_V may adjust a capacitance in response to the received capacitance control signal C_CS.

Figure 9A:
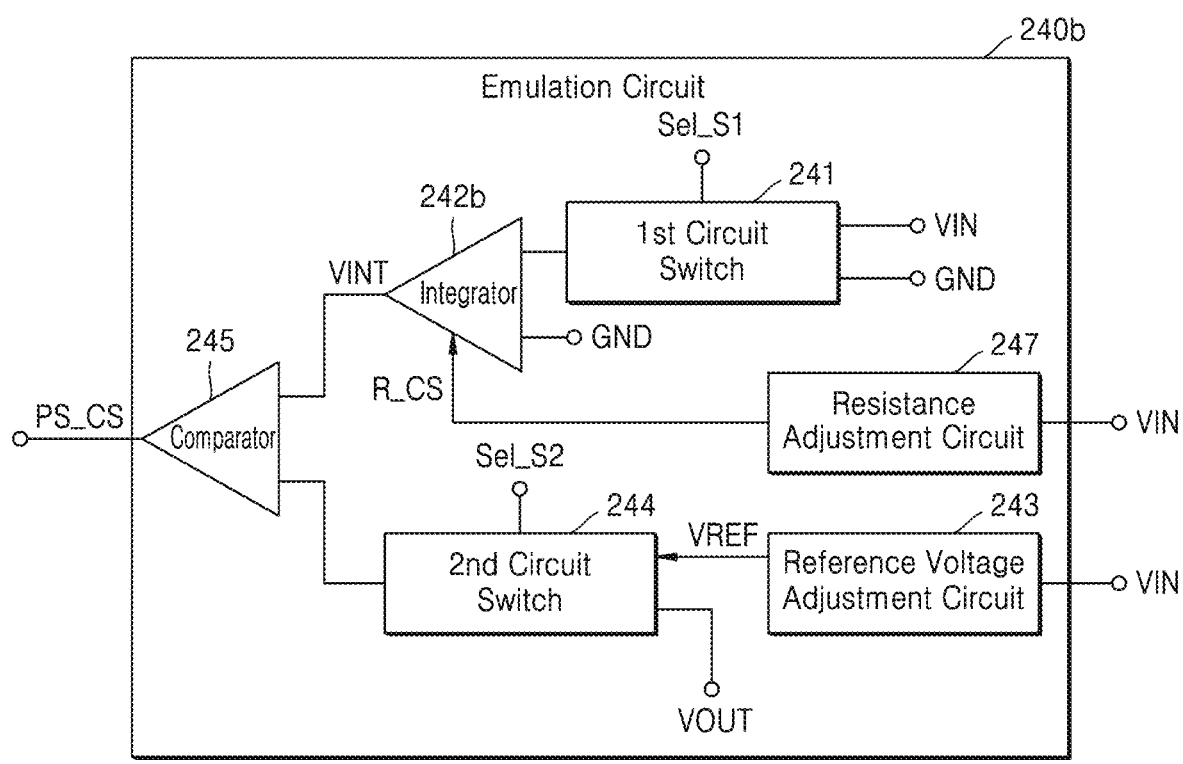
FIG. 9A is a block diagram of an emulation circuit according to example embodiments.
Figure 9B:
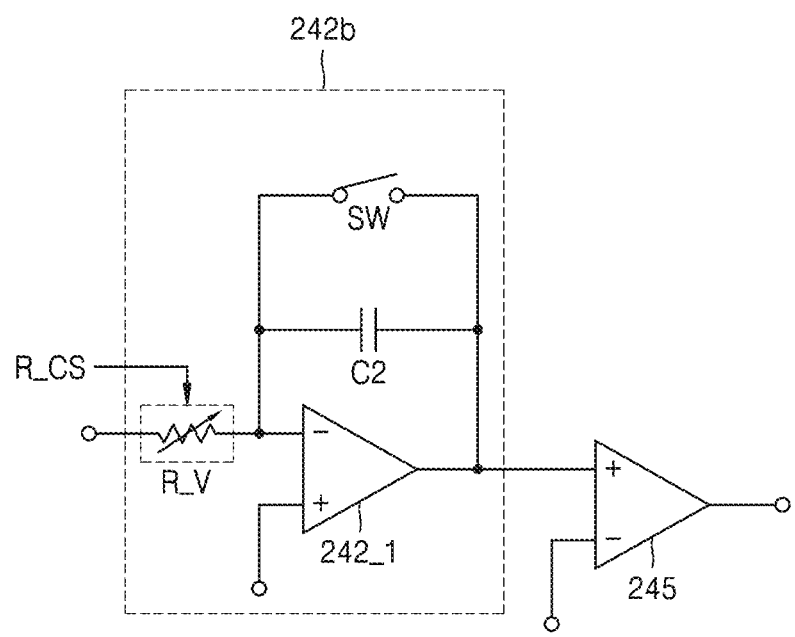
FIG. 9B is a detailed diagram of an integrator of FIG. 9A.

FIG. 9A is a block diagram of an emulation circuit 240b according to example embodiments, and FIG. 9B is a detailed diagram of an integrator 242b of FIG. 9A. Hereinafter, the descriptions of the emulation circuit 240b and the integrator 242b that are the same as those of the emulation circuit 240 and the integrator 242 of FIG. 4 will be omitted.

Referring to FIG. 9A, as compared with the emulation circuit 240 of FIG. 4, the emulation circuit 240b may further include a resistance adjustment circuit 247. The resistance adjustment circuit 247 may receive an input voltage VIN and generate a resistance control signal R_CS for adjusting a resistance of the integrator 242b based on the input voltage VIN. As described with reference to Equation 8 of FIG. 6, the resistance adjustment circuit 247 may change the resistance of the integrator 242b to change a peak value of an inductor current. As an example, when a level of the input voltage VIN is changed to be lower than before, the resistance adjustment circuit 247 may generate a resistance control signal R_CS for adjusting the resistance of the integrator 242b to a lower value than before. The integrator 242b may adjust the resistance based on the resistance control signal R_CS.

Referring further to FIG. 9B, as compared with the integrator 242 of FIG. 4, the integrator 242b may include a variable resistor element R_V. The variable resistor element R_V may adjust the resistance in response to the resistance control signal R_CS received from the resistance adjustment circuit 247.

In some an embodiments, the emulation circuit 240b may further include a capacitance adjustment circuit, and the integrator 242b may further include a variable capacitor element. The emulation circuit 240b may change a peak value of current of an inductor element by adjusting a reference voltage VREF and the resistance and a capacitance of the integrator 242b.

Figure 10:
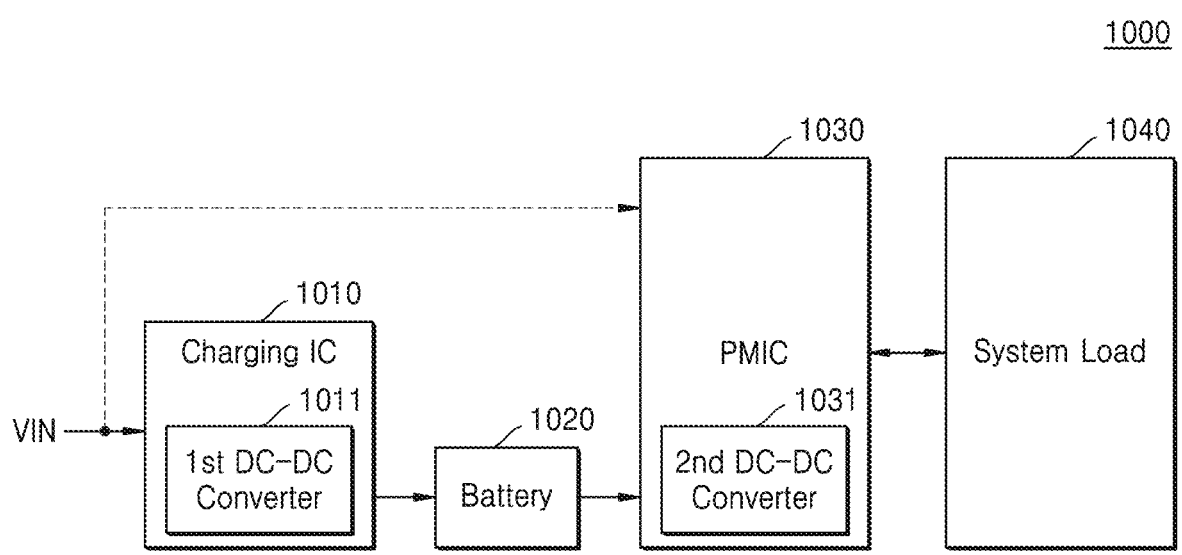
FIG. 10 is a block diagram of an electronic device according to example embodiments.

FIG. 10 is a block diagram of an electronic device 1000 according to example embodiments.

Referring to FIG. 10, the electronic device 1000 may include a charging IC 1010, a battery 1020, a PMIC 1030, and/or a system load 1040. The charging IC 1010 may include a first DC-DC converter 1011 to which example embodiments described with reference to FIGS. 1A and 1B are applied. The first DC-DC converter 1011 may adjust at least one parameter for changing a peak value of current of an inductor element in response to a change in level of an input voltage VIN, and generate an interval voltage based on the at least one parameter that is adjusted. The first DC-DC converter 1011 may perform a switching operation based on the internal voltage such that the current of the inductor element has a pattern corresponding to a pattern of the internal voltage, and generate an output voltage from the input voltage VIN. The first DC-DC converter 1011 may provide the output voltage to the battery 1020, and the battery 1020 may be charged with the output voltage.

The PMIC 1030 may generate or manage voltages required for internal components (e.g., the system load 1040) of the electronic device 1000. The PMIC 1030 may include a second DC-DC converter 1031 to which example embodiments described with reference to FIGS. 1A and 1B are applied. The second DC-DC converter 1031 may directly receive the input voltage VIN or receive a voltage from the battery 1020 and perform a conversion operation according to the above-described example embodiments. The second DC-DC converter 1031 may generate the output voltage based on the input voltage VIN or the voltage from the battery 1020 and provide the output voltage to the system load 1040.

Figure 11A:
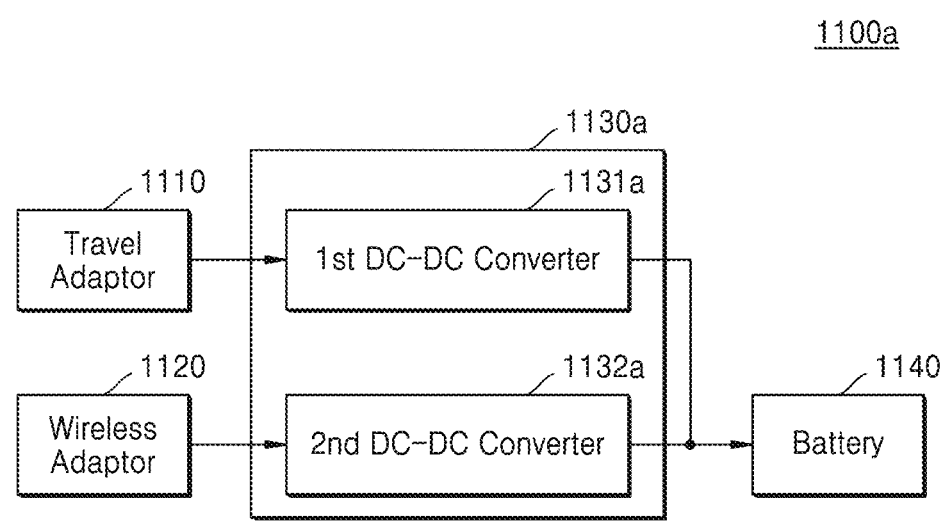
FIGS. 11A and 11B are block diagrams of electronic devices according to example embodiments.
Figure 11B:
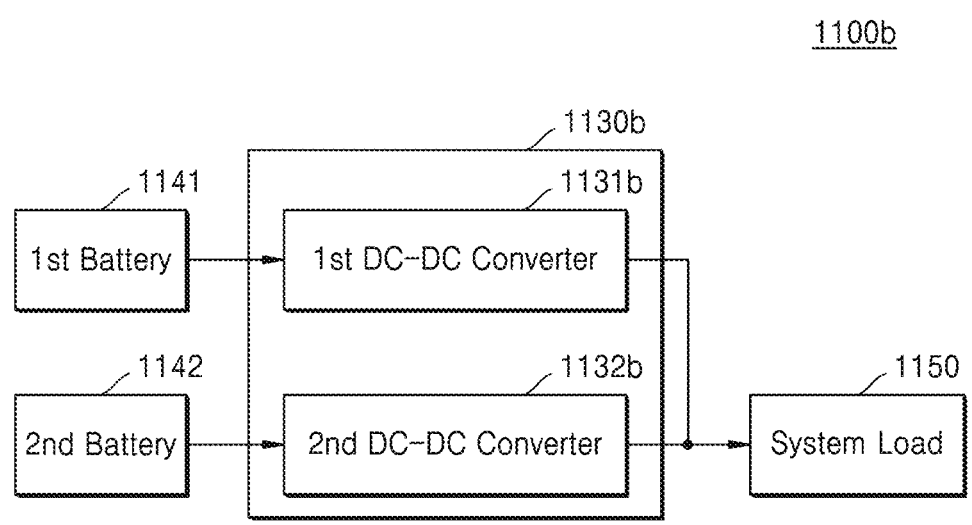

FIGS. 11A and 11B are block diagrams of electronic devices 1100a and 1100b according to example embodiments.

Referring to FIG. 11A, the electronic device 1100a may include a travel adaptor 1110, a wireless adaptor 1120, an IC 1130a, and/or a battery 1140. The IC 1130a may include first and second DC-DC converters 1131a and 1132a to which example embodiments described with reference to FIGS. 1A and 1B are applied. The travel adaptor 1110 may convert power supplied from a household power source or another power supply source into DC power. The wireless adaptor 1120 may convert DC power according to a predetermined or alternatively, desired wireless charging method. The wireless charging method may include at least one of various wireless charging methods, such as a magnetic induction method, a magnetic resonance method, an electromagnetic induction method, and a non-radiative wireless charging method.

The travel adaptor 1110, which is a first unit, may be connected to the first DC-DC converter 1131a and provide a first input voltage to the first DC-DC converter 1131a through a first input terminal. The wireless adaptor 1120, which is a second unit, may be connected to the second DC-DC converter 1132a and provide a second input voltage to the second DC-DC converter 1132a through a second input terminal. As an example, when the first input voltage is different from the second input voltage, the first and second DC-DC converters 1131a and 1132a may respectively generate internal voltages based on different parameters and perform voltage conversion operations. In some example embodiments, a peak value of current of an inductor element of the first DC-DC converter 1131a may be different from that of current of an inductor element of the second DC-DC converter 1132a. The first and second DC-DC converters 1131a and 1132a may generate first and second output voltages from the first and second input voltages, respectively, and charge the battery 1140. In example embodiments, a level difference between the first and second output voltages may be maintained within a threshold range. In some example embodiments, the battery 1140 may include a plurality of batteries.

Referring to FIG. 11B, the electronic device 1100b may include first and second batteries 1141 and 1142, an IC 1130b, and/or a system load 1150. The first battery 1141, which is a first unit, may be connected to a first DC-DC converter 1131b and provide a first input voltage to the first DC-DC converter 1131b through a first input terminal. The second battery 1142, which is a second unit, may be connected to a second DC-DC converter 1132b and provide a second input voltage to the second DC-DC converter 1132b through a second input terminal. As an example, when the first input voltage is different from the second input voltage, the first and second DC-DC converters 1131*b* and 1132*b* may respectively generate internal voltages based on different parameters and perform voltage conversion operations. In some example embodiments, a peak value of current of an inductor element of the first DC-DC converter 1131*b* may be different from that of current of an inductor element of the second DC-DC converter 1132*b*. The first and second DC-DC converters 1131*b* and 1132*b* may generate first and second output voltages from the first and second input voltages, respectively, and provide the first and second output voltages to the system load 1150. In example embodiments, a level difference between the first and second output voltages may be maintained within a threshold range.

Figure 12:
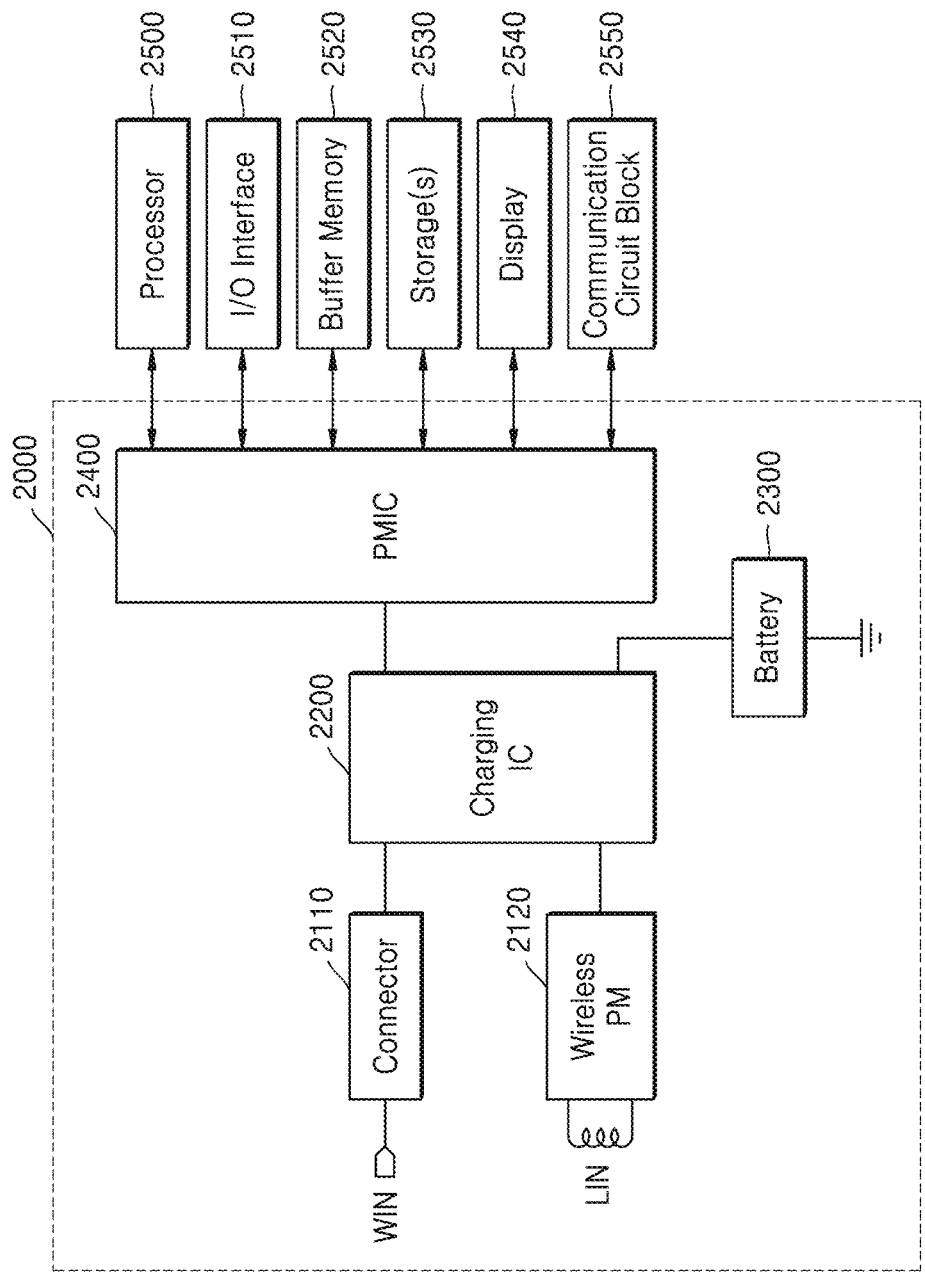
FIG. 12 is a block diagram of a power system of a mobile device, according to example embodiments.

FIG. 12 is a block diagram of a power system 2000 of a mobile device, according to example embodiments.

Referring to FIG. 12, the power system 2000 may include a connector 2110, a wireless power manager (wireless PM) 2120, a charging IC 2200, a battery 2300, and/or a PMIC 2400.

The power system 2000 may be used to supply power to the mobile device. The power system 2000 may receive power from a power source that is connected by wire through a conversion device (e.g., an adaptor). Alternatively, the power system 2000 may receive power from a power source that is wirelessly connected thereto by the resonance of an inductor. The power system 2000 may appropriately convert the received power. The power system 2000 may supply the converted power to components of a mobile electronic device.

As an example, the connector 2110 may be connected to a conversion device (e.g., an adaptor) through a wired input terminal WIN. The connector 2110 may receive power from a power source connected by wire thereto. The connector 2110 may appropriately convert the received power and provide the converted power to the charging IC 2200.

As an example, the wireless PM 2120 may be connected to an input inductor LIN. The input inductor LIN may resonate with a transmission inductor (not shown) of a wireless power transmitter. The wireless PM 2120 may receive power from a power source that is wirelessly connected thereto due to resonance between the input inductor LIN and the transmission inductor. The wireless PM 2120 may appropriately convert the received power and provide the converted power to the charging IC 2200.

The charging IC 2200 may operate in one of a battery power mode, a charging mode, and a boost mode. As an example, when power is not supplied through the connector 2110 and the wireless PM 2120, the charging IC 2200 may operate in the battery power mode. In the battery power mode, the charging IC 2200 may receive power from the battery 2300. The charging IC 2200 may perform a conversion operation according to example embodiments in response to a change in level of an input voltage provided by the battery 2300, generate an output voltage, and provide the generated output voltage to the PMIC 2400.

The charging IC 2200 may receive power from at least one of the connector 2110 and the wireless PM 2120. As an example, when power is provided through at least one of the connector 2110 and the wireless PM 2120, the charging IC 2200 may operate in a charging mode. In the charging mode, the charging IC 2200 may perform a conversion operation according to example embodiments in response to a change in level of an input voltage provided by the connector 2110 or the wireless PM 2120, generate an output voltage, and provide the output voltage to the battery 2300. Furthermore, the charging IC 2200 may provide a converted output voltage to the PMIC 2400.

As an example, a peripheral device (e.g., a keyboard, a speaker, and the like) used to assist the use of the mobile electronic device may be connected to the charging IC 2200 through the connector 2110. The charging IC 2200 may operate in a boost mode to supply power to a peripheral device. In the boost mode, the charging IC 2200 may boost the output voltage of the battery 2300 and provide the boosted voltage to the peripheral device. When necessary, in the boost mode, the charging IC 2200 may perform a conversion operation according to example embodiments in response to a change in level of an input voltage provided by the battery 2300, generate an output voltage, and provide the output voltage to the PMIC 2400.

A configuration and operations of the charging IC 2200 according to example embodiments may be understood with reference to FIGS. 1A to 9B and the descriptions thereof. The PMIC 2400 may receive an input voltage from the charging IC 2200. As an example, the PMIC 2400 may perform a conversion operation according to example embodiments in response to the input voltage provided by the charging IC 2200, generate an output voltage, and provide the output voltage to other components of the mobile electronic device. As an example, each of a processor 2500, an input/output (I/O) interface 2510, a memory 2520, a storage 2530, a display 2540, and/or a communication circuit block 2550 included in the mobile electronic device may operate by using the output voltage received from the PMIC 2400.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. A direct-current (DC)-DC converter comprising:
 a converting circuit comprising an inductor element, the converting circuit being configured to generate an output voltage from an input voltage based on a switching operation; and
 an inductor current emulator configured to adjust at least one parameter for changing a current peak value of the inductor element in response to a change in a level of the input voltage and generate an internal voltage based on the at least one parameter, which is adjusted,
 wherein the inductor current emulator is configured to generate a control signal for controlling the switching operation such that current of the inductor element has a pattern corresponding to a pattern of the internal voltage.

2. The DC-DC converter of claim 1, wherein the at least one parameter comprises a level of a reference voltage related to the current peak value of the inductor element, wherein the inductor current emulator is configured to generate the internal voltage by selectively using any one of the reference voltage having an adjusted level and the output voltage.

3. The DC-DC converter of claim 2, wherein the at least one parameter further comprises a capacitance related to the current peak value of the inductor element,
wherein the inductor current emulator comprises an integrator comprising a variable capacitor element configured to adjust the capacitance to generate the internal voltage.

4. The DC-DC converter of claim 1, wherein the converting circuit comprises a switch pulse generator configured to generate a pulse signal based on the control signal; and
a switch circuit configured to selectively provide any one of the input voltage and a ground voltage to the inductor element in response to the pulse signal.

5. The DC-DC converter of claim 1, wherein the inductor current emulator comprises an emulation circuit,
wherein the emulation circuit comprises:
an integrator configured to receive the output voltage and generate the internal voltage;
a first switch circuit configured to receive any one of the input voltage and a ground voltage depending on an operation section of the integrator and provide the received voltage to the integrator;
a first comparator configured to compare the internal voltage with a comparison voltage and generate the control signal;
a second switch circuit configured to receive any one of a reference voltage and the output voltage depending on the operation section of the integrator and provide the received voltage as the comparison voltage to the integrator; and
a reference voltage adjustment circuit configured to provide the reference voltage of which a level is adjusted in response to the change in the level of the input voltage, to the second switch circuit.

6. The DC-DC converter of claim 5, wherein the first switch circuit is configured to provide the input voltage to the integrator in an initial section or a discharging section of the integrator and is configured to provide the ground voltage to the integrator in a charging section of the integrator, and
the second switch circuit is configured to provide the reference voltage as the comparison voltage to the comparator in the discharging section and is configured to provide the output voltage as the comparison voltage to the comparator in the charging section.

7. The DC-DC converter of claim 6, wherein the integrator comprises:
a second comparator configured to be connected to a first input node connected to the first switch circuit and a second input node configured to receive the output voltage;
a capacitor element configured to be connected between the first input node and an output node of the second comparator configured to output the internal voltage; and
a switch element configured to be connected to the capacitor element in parallel between the first input node and the output node.

8. The DC-DC converter of claim 7, wherein the switch element is configured to be closed in the initial section and is configured to be open in the discharging section or the charging section.

9. The DC-DC converter of claim 7, wherein a capacitance of the capacitor element is changed based on the change of the level of the input voltage.

10. The DC-DC converter of claim 5, wherein the first and second switch circuits are configured to receive the control signal and are configured to perform a voltage selection operation based on the control signal.

11. The DC-DC converter of claim 1, wherein the pattern of the internal voltage has a mutual inversion relationship with the pattern of the current of the inductor element.

12. The DC-DC converter of claim 1, wherein the inductor current emulator is configured to generate the control signal for allowing a first ratio between a first section and a second section to correspond to a second ratio between the output voltage and a voltage obtained by subtracting the input voltage from the output voltage, wherein the input voltage is provided to the inductor element in the first section, and a ground voltage is provided to the inductor element in the second section.

13. An integrated circuit comprising:
a first input terminal configured to be connected to any one of a plurality of units; and
a first buck converter connected to the first input terminal and configured to receive a first input voltage and generate a first output voltage from the first input voltage,
wherein the first buck converter comprises:
a first converting circuit comprising a first inductor element and configured to output the first output voltage from the first input voltage based on a first switching operation; and
a first inductor current emulator configured to generate a first internal voltage using a first reference voltage, the first input voltage, and the first output voltage and configured to generate a first control signal for controlling the first switching operation such that current of the first inductor element has a pattern corresponding to a pattern of the first internal voltage.

14. The integrated circuit of claim 13, wherein the first inductor current emulator is configured to adjust a level of the first reference voltage to change a current peak value of the first inductor element in response to a change in level of the first input voltage.

15. The integrated circuit of claim 13, wherein the first inductor current emulator comprises:
an integrator configured to receive the first output voltage and generate the first internal voltage;
a first switch circuit configured to provide any one of the first input voltage and a ground voltage to the integrator depending on an operation section of the integrator;
a second switch circuit configured to compare the first internal voltage with a comparison voltage and generate the first control signal; and
a reference voltage adjustment circuit configured to provide the first reference voltage of which a level is adjusted, to the second switch circuit in response to a change in level of the first input voltage.

16. The integrated circuit of claim 13, further comprising:
a second input terminal configured to be connected to any one of the plurality of units; and
a second buck converter connected to the second input terminal and configured to receive a second input voltage and generate a second output voltage from the second input voltage,
wherein the second buck converter comprises:
a second converting circuit comprising a second inductor element, the second converting circuit being configured to output the second output voltage from the second input voltage based on a second switching operation; and a second inductor current emulator configured to generate a second internal voltage by using a second reference voltage, the second input voltage, and the second output voltage, the second inductor current emulator being configured to generate a second control signal for controlling the second switching operation such that current of the second inductor element has a pattern corresponding to a pattern of the second internal voltage.

17. A direct-current (DC)-DC converter comprising:

a converting circuit comprising an inductor element, the converting circuit being configured to provide an input voltage to the inductor element in a first section and provide a ground voltage to the inductor element in a second section; and an inductor current emulator configured to generate an internal voltage using a reference voltage, the input voltage, and an output voltage and configured to generate a control signal for controlling the first and second sections such that current of the inductor element has an inverted pattern of a pattern of the internal voltage.

18. The DC-DC converter of claim 17, wherein the inductor current emulator is configured to generate the control signal for allowing a first ratio between the first section and the second section to correspond to a second ratio between the output voltage and a voltage obtained by subtracting the input voltage from the output voltage.

19. The DC-DC converter of claim 17, wherein the inductor current emulator is configured to drop the internal voltage to the reference voltage in the first section and boost the internal voltage from the reference voltage to a predetermined voltage level in the second section.

20. The DC-DC converter of claim 17, wherein the inductor current emulator is configured to set the internal voltage to the same value as the output voltage in an initial section preceding the first and second sections.

* * * * *